(12) United States Patent
Chang

(10) Patent No.: US 11,315,366 B2
(45) Date of Patent: Apr. 26, 2022

(54) CONFERENCE RECORDING METHOD AND DATA PROCESSING DEVICE EMPLOYING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Chi-Yu Chang, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 353 days.

(21) Appl. No.: 16/585,806

(22) Filed: Sep. 27, 2019

(65) Prior Publication Data

US 2020/0410265 A1 Dec. 31, 2020

(30) Foreign Application Priority Data

Jun. 28, 2019 (CN) .......................... 201910583993.2

(51) Int. Cl.
| | |
|---|---|
| *G06V 40/70* | (2022.01) |
| *H04N 7/15* | (2006.01) |
| *G10L 17/02* | (2013.01) |
| *G06K 9/62* | (2022.01) |
| *G10L 17/06* | (2013.01) |
| *G10L 17/00* | (2013.01) |
| *G06V 40/16* | (2022.01) |

(52) U.S. Cl.
CPC ........... *G06V 40/70* (2022.01); *G06K 9/6256* (2013.01); *G06V 40/168* (2022.01); *G06V 40/172* (2022.01); *G10L 17/00* (2013.01); *G10L 17/02* (2013.01); *G10L 17/06* (2013.01); *H04N 7/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0222386 | A1* | 8/2013 | Tannhauser | G06T 3/4038 345/428 |
| 2016/0300135 | A1* | 10/2016 | Moudy | G06F 40/30 |
| 2016/0353165 | A1* | 12/2016 | Lee | H04N 21/42204 |
| 2019/0080433 | A1* | 3/2019 | He | G06T 5/50 |
| 2019/0361830 | A1* | 11/2019 | Tae | G06F 1/24 |
| 2020/0310842 | A1* | 10/2020 | Yen | G06F 11/366 |

\* cited by examiner

*Primary Examiner* — Phung-Hoang J Nguyen
(74) *Attorney, Agent, or Firm* — ScienBiziP, P.C.

(57) ABSTRACT

A conference recording method is provided. The method includes obtaining a multimedia file corresponding to a conference, the multimedia file includes video data and audio data. Posture language of each person is recognized from the video data. Facial features and voice features of each person are extracted from the multimedia file. Personal identity information of each person is identified according to the facial features and the voice features of each person. Once the audio data corresponding to each person is converted into text information, the posture language, the personal identity information, and the text information corresponding to each person are output.

15 Claims, 3 Drawing Sheets

CONFERENCE RECORDING METHOD AND DATA PROCESSING DEVICE EMPLOYING THE SAME

FIELD

The present disclosure relates to data processing technologies, in particular to a conference recording method and a data processing device employing the same.

BACKGROUND

Generally, a conference recording system can record content of a conference using a multimedia file. However, the conference recording system cannot effectively recognize a speech of a person speaking in a conference, and cannot identify the person who is talking. Therefore, there is a room to improve the conference recording system.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
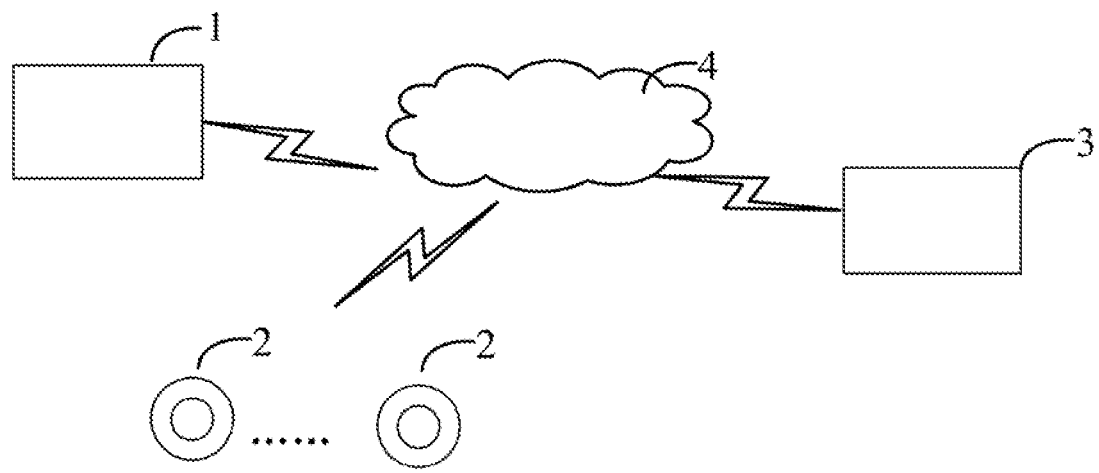
FIG. 1 illustrates a schematic diagram of an environment architecture in which a conference recording method is applied.

FIG. 1 illustrates a schematic diagram of an environment architecture in which a conference recording method is applied.

In at least one embodiment, the conference recording method is applied to a data processing device 1. The data processing device 1 establishes a communication connection with at least one capture device 2 and at least one output device 3 via a network 4. The network 4 can be a wired network or a wireless network, such as radio, Wireless Fidelity (WIFI), cellular, satellite, broadcast, and the like.

The data processing device 1 can be an electronic device such as personal computer, a server, a neural computing stick, AI calculation stick, or a processor having a function of performing edge computing, etc. In at least one embodiment, the server can be a single server, a server cluster, or a cloud server.

The capture device 2 can be an electronic device having a function of capturing video. The capture device 2 can be a 360° panoramic camera, a video camera, or the like.

The output device 3 can be an electronic device having a display screen. The output device 3 can be an electronic whiteboard having large display screen, a television, a display, a projector, or the like.

In at least one embodiment, the capture device 2 is a 360° panoramic camera, and can be used to collect data such as video data and audio data generated during a conference. The capture device 2 can transmit the collected data to the data processing device 1.

In at least one embodiment, the data processing device 1 can be a computer device that is being connected with a neural computing stick. The neural computing stick has a function of performing edge computing. In at least one embodiment, the neural computing stick can analyze the collected data and sends the analyzed data to the data processing device 1. The data processing r device 1 can store the analyzed data, and can further store the collected data. The output device 3 can be the electronic whiteboard, and can be used to display the analyzed data. In other embodiments, a plurality of neural computing sticks can be used to analyze the collected data to speed up analysis of the collected data.

Figure 2:
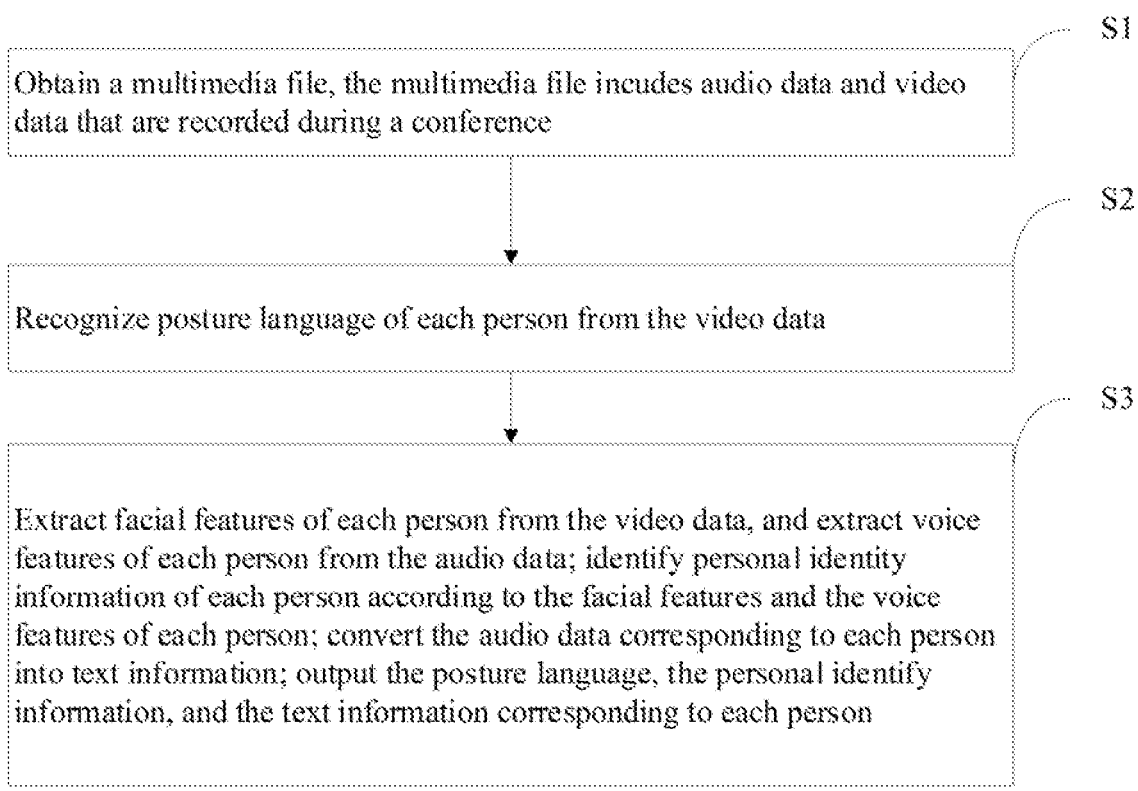
FIG. 2 shows a flow chart of one embodiment of a conference recording method.

FIG. 2 shows a flow chart of one embodiment of a conference recording method. Referring to FIG. 2, the method is provided by way of example, as there are a variety of ways to carry out the method. The method described below can be carried out using the configurations illustrated in FIG. 1, for example, and various elements of these figures are referenced in explanation of method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, the data processing device 1 can obtain a multimedia file. The multimedia file includes audio data and video data that are recorded during a conference.

In at least one embodiment, the data processing device 1 can obtain the multimedia file using the capture device 2, and the capture device 2 can be the 360° panoramic camera. The capture device 2 can capture facial expression and posture action of each person of the conference, and can collect voice of the each person.

In other embodiments, the video data of the multimedia file is recorded using the capture device 2. The audio data of the multimedia file is recorded using one or more microphones (no shown in figure) that are set in a conference room in which the conference is hold. In other words, the facial expression and posture action of each person of the conference is recorded using the capture device 2, and the voice of the each person is collected using the one or more microphones.

In at least one embodiment, the data processing device 1 can further preprocess the multimedia file.

In at least one embodiment, the preprocessing of the multimedia file includes:

separating the video data and the audio data from the multimedia file;

determining whether the video data includes face information (e.g., a human face) and/or posture information (e.g., a posture action); and determining whether the audio data includes voice;

sharpening the face information when the video data includes the face information; sharpening the posture information when the video data includes the posture information; and enhancing the voice included in the audio data when the audio data includes voice; and obtaining a new multimedia file from the capture device 2 when the video data does not include the human face, and the audio data does not include any voice.

In at least one embodiment, the sharpening of the face information and/or posture information included in the video data includes: invoking a preset program script to enhance one or more images that are unclear included in the video data, and to remove unnecessary background included in the video data. The image that are unclear can be defined to be an image having a resolution less than a preset value. The unnecessary background can be defined as background not having single color.

In at least one embodiment, the enhancing of the voice includes: removing background noise included in the audio data using a sound enhancement method that is based on independent component analysis, so that the voice contained in the audio data is enhanced.

At block S2, the data processing device 1 can recognize posture language of each person from the video data.

In at least embodiment, the recognizing of the posture language of each person from the video data includes:

extracting each image frame which includes the person from the video data;

identifying key points of each person in each image frame, generating a connection line corresponding to each image frame by connecting the key points in each image frame, and converting each connection line into a vector distance, and determining a posture feature of the person in each image frame according to the vector distance; and determining the posture language of each person by searching a predetermined database according to the posture feature. The predetermined database pre-stores a relationship between the posture feature and the posture language.

For example, the predetermined database pre-stores that the posture feature "the mouth angle is raised" corresponding to the posture language "happy and pleasant".

In at least one embodiment, the key points can include, but are not limited to, a brow head, a brow tail, a corner of a mouth, a middle point of the lip, a tip of the nose, a tibia, an elbow, a finger, etc.

In at least one embodiment, the determining of the posture feature includes determining distance changes between two of the key points.

For example, the data processing device 1 can determine the posture feature is "the mouth angle is raised" or "the mouth angle is bent downwards" according to the changes in distance between the corner of the mouth and the middle point of the lip.

At block S3, the data processing device 1 can extract facial features of each person from the video data, and extract voice features of each person from the audio data. The data processing device 1 can identify personal identity information of each person according to the facial features and the voice features of each person. The data processing device 1 can convert the audio data corresponding to each person into text information. The data processing device 1 can further output the posture language, the personal identify information, and the text information corresponding to each person.

In at least one embodiment, the data processing device 1 can extract the facial features of each person using a face recognition model. The data processing device 1 can recognize voice features of each person using a voiceprint recognition method. In other embodiments, the data processing device 1 can recognize the voice features of each person using a voice recognition model.

In at least one embodiment, the personal identity information can include, but is not limited to, a name, a position, an age, a length of service, technical expertise, hobbies of the person, and the like.

In at least one embodiment, the identifying of personal identity information of each person according to the facial features and the voice features of each person includes: searching the predetermined database according to the facial features and the voice features of each person, the predetermined database pre-stores a relationship between the personal identity information of each person and the facial features and the voice features of each person.

In at least one embodiment, when the personal identity information of the person cannot be obtained from the predetermined database, the data processing device 1 can stores the facial features and the voice features of the person in the predetermined database.

In at least one embodiment, the data processing device 1 can establish the face recognition model, and the establishing of the face recognition model includes:

obtaining a sample set, wherein the sample set includes a plurality of images each of which includes face features;

dividing the sample set into a training set and a verification set, wherein the training set includes X number of images, and the verification set includes Y number of images, and a total number of the plurality of images equaling a sum of X and Y;

training a convolutional neural network model using the training set and obtaining a trained convolutional neural network model;

verifying the trained convolutional neural network model using the verification set, and calculating a predictive accuracy of the trained convolutional neural network model; and setting the trained convolutional neural network model as the face recognition model when the predictive accuracy of the trained convolutional neural network model is greater than a preset value.

In at least one embodiment, the data processing device 1 can establish the voice recognition mode, and the establishing of the voice recognition model includes:

obtaining a sample set, wherein the sample set includes a plurality of audio clips;

converting each of the audio clips into an image, such that a plurality of images are obtained;

dividing the plurality of images into a training set and a verification set, wherein the training set includes X number of images, and the verification set includes Y number of images, and a total number of the plurality of images equals a sum of X and Y;

training a convolutional neural network model using the training set and obtaining a trained convolutional neural network model;

verifying the trained convolutional neural network model using the verification set, and calculating a predictive accuracy of the trained convolutional neural network model; and setting the trained convolutional neural network model as the voice recognition model when the predictive accuracy of the trained convolutional neural network model is greater than a preset value.

In at least one embodiment, the outputting of the posture language, and the text information corresponding to each person includes:

searching each person from the video data;

importing the posture language, the personal identify information, and the text information of the each person into the video data; and displaying the video data that has been imported the posture language, the personal identify information, and the text information of the each person.

In at least one embodiment, the data processing device 1 can further determine mood of the each person according to a sound level, a tone, and a frequency of the voice of the each person. The data processing device 1 can further indicate the mood of the each person in the video data. In at least one embodiment, the data processing device 1 can indicate the mood of the each person using text.

In at least one embodiment, the data processing device 1 can further generate a conference record based on the posture language, and the text information corresponding to each person; and display the generated conference record using the output device 3.

In at least one embodiment, the data processing device 1 can generate the conference record according to speaking time corresponding to the posture language, and speaking time corresponding to the text information that is corresponding to each person.

It should be noted that the data processing device 1 should obtain the speaking time corresponding to the posture language, and the speaking time corresponding to the text information that is corresponding to each person from the multimedia file.

In the embodiment, all the blocks that are described above are executed by the data processing device 1. In other embodiments, all the blocks can be executed by a neural computing stick that is connected with the data processing device 1. The neural computing stick can execute each block and send an execution result to the data processing device 1. Such that the data processing device 1 can obtain the generated conference record from the neural computing stick.

Figure 3:
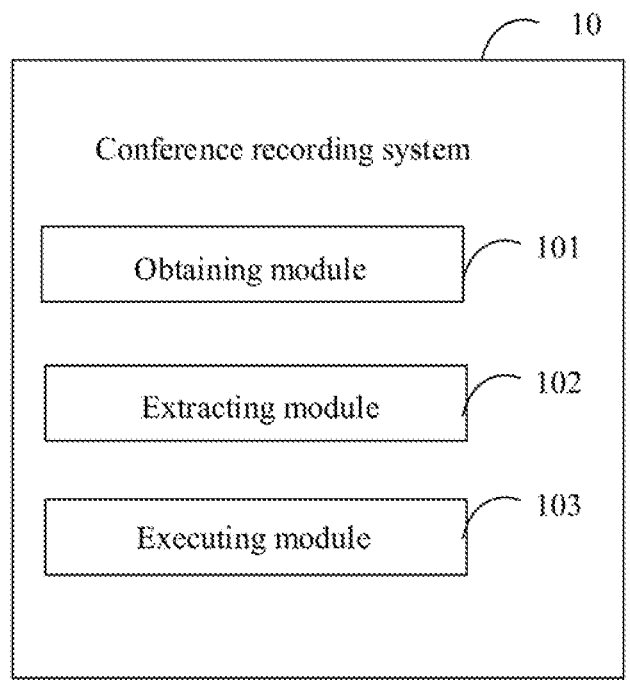
FIG. 3 shows one embodiment of modules of a conference recording system of the present disclosure.

FIG. 3 shows an embodiment of modules of a conference recording system of the present disclosure.

In some embodiments, the conference recording system 10 runs in a data processing device. The conference recording system 10 can include a plurality of modules. The plurality of modules can comprise computerized instructions in a form of one or more computer-readable programs that can be stored in a non-transitory computer-readable medium (e.g., a storage device of the data processing device), and executed by at least one processor of the data processing device to implement conference recording function (described in detail in FIG. 2).

In at least one embodiment, the conference recording system 10 can include a plurality of modules. The plurality of modules can include, but is not limited to an obtaining module 101, an extracting module 102, and an executing module 103. The modules 101-103 can comprise computerized instructions in the form of one or more computer-readable programs that can be stored in the non-transitory computer-readable medium (e.g., the storage device of the data processing device), and executed by the at least one processor of the data processing device to implement conference recording function (e.g., described in detail in FIG. 2).

The obtaining module 101 can obtain a multimedia file. The multimedia file includes audio data and video data that are recorded during a conference.

In at least one embodiment, the obtaining module 101 can obtain the multimedia file using the capture device 2, and the capture device 2 can be the 360° panoramic camera. The capture device 2 can capture facial expression and posture action of each person of the conference, and can collect voice of the each person.

In other embodiments, the video data of the multimedia file is recorded using the capture device 2. The audio data of the multimedia file is recorded using one or more microphones (no shown in figure) that are set in a conference room in which the conference is hold. In other words, the facial expression and posture action of each person of the conference is recorded using the capture device 2, and the voice of the each person is collected using the one or more microphones.

In at least one embodiment, the obtaining module 101 can further preprocessing the multimedia file.

In at least one embodiment, the preprocessing of the multimedia file includes:

separating the video data and the audio data from the multimedia file;

determining whether the video data includes face information (e.g., a human face) and/or posture information (e.g., a posture action); and determining whether the audio data includes voice;

sharpening the face information when the video data includes the face information; sharpening the posture information when the video data includes the posture information; and enhancing the voice included in the audio data when the audio data includes voice; and obtaining a new multimedia file from the capture device 2 when the video data does not include the human face, and the audio data does not include the voice.

In at least one embodiment, the sharpening of the face information and/or posture information included in the video data includes: invoking a preset program script to enhance one or more images that are unclear included in the video data, and to remove unnecessary background included in the video data. The image that are unclear can be defined to be an image having a resolution less than a preset value. The unnecessary background can be defined as background not having single color.

In at least one embodiment, the enhancing of the voice includes: removing background noise included in the audio data using a sound enhancement method that is based on independent component analysis, so that the voice contained in the audio data is enhanced.

The extracting module 102 can recognize posture language of each person from the video data.

In at least embodiment, the recognizing of the posture language of each person from the video data includes:

extracting each image frame including the person from the video data;

identifying key points of each person in each image frame, generating a connection line corresponding to each image frame by connecting the key points in each image frame, and converting each connection line into a vector distance, and determining a posture feature of the person in each image frame according to the vector distance; and determining the posture language of each person by searching a predetermined database according to the posture feature. The predetermined database pre-stores a relationship between the posture feature and the posture language.

For example, the predetermined database pre-stores that the posture feature "the mouth angle is raised" corresponding to the posture language "happy and pleasant".

In at least one embodiment, the key points can include, but are not limited to, a brow head, a brow tail, a corner of a mouth, a middle point of the lip, a tip of the nose, a tibia, an elbow, a finger, etc.

In at least one embodiment, the determining of the posture feature includes determining distance changes between two of the key points.

For example, the extracting module 102 can determine the posture feature is "the mouth angle is raised" or "the mouth angle is bend downwards" according to the distance changes between the corner of the mouth and the middle point of the lip.

The executing module 103 can extract facial features of each person from the video data, and extract voice features of each person from the audio data. The executing module 103 can identify personal identity information of each person according to the facial features and the voice features of each person. The executing module 103 can convert the audio data corresponding to each person into text information. The executing module 103 can further output the posture language, and the text information corresponding to each person.

In at least one embodiment, the executing module 103 can extract the facial features of each person using a face recognition model. The executing module 103 can recognize voice features of each person using a voiceprint recognition method. In other embodiments, the executing module 103 can recognize the voice features of each person using a voice recognition model.

In at least one embodiment, the personal identity information can include, but is not limited to, a name, a position, an age, a length of service, technical expertise, hobbies of the person, and the like.

In at least one embodiment, the identifying of personal identity information of each person according to the facial features and the voice features of each person includes: searching the predetermined database according to the facial features and the voice features of each person, the predetermined database pre-stores a relationship between the personal identity information of each person and the facial features and the voice features of each person.

In at least one embodiment, when the personal identity information of the person cannot be obtained from the predetermined database, the executing module 103 can stores the facial features and the voice features of the person in the predetermined database.

In at least one embodiment, the executing module 103 1 can establish the face recognition model, and the establishing of the face recognition model includes:

obtaining a sample set, wherein the sample set includes a plurality of images each of which including face features;

dividing the sample set into a training set and a verification set, wherein the training set includes X number of images, and the verification set includes Y number of images, and a total number of the plurality of images equals a sum of X and Y;

training a convolutional neural network model using the training set and obtaining a trained convolutional neural network model;

verifying the trained convolutional neural network model using the verification set, and calculating a predictive accuracy of the trained convolutional neural network model; and setting the trained convolutional neural network model as the face recognition model when the predictive accuracy of the trained convolutional neural network model is greater than a preset value.

In at least one embodiment, the executing module 103 1 can establish the voice recognition mode, and the establishing of the voice recognition model includes:

obtaining a sample set, wherein the sample set includes a plurality of audio clips;

converting each of the audio clips into an image, such that a plurality of images are obtained;

dividing the plurality of images into a training set and a verification set, wherein the training set includes X number of images, and the verification set includes Y number of images, and a total number of the plurality of images equals a sum of X and Y;

training a convolutional neural network model using the training set and obtaining a trained convolutional neural network model;

verifying the trained convolutional neural network model using the verification set, and calculating a predictive accuracy of the trained convolutional neural network model; and setting the trained convolutional neural network model as the voice recognition model when the predictive accuracy of the trained convolutional neural network model is greater than a preset value.

In at least one embodiment, the outputting of the posture language, and the text information corresponding to each person includes:

searching each person from the video data;

importing the posture language, the personal identify information, and the text information of the each person into the video data; and displaying the video data that has been imported the posture language, the personal identify information, and the text information of the each person.

In at least one embodiment, the executing module 103 can further determine mood of the each person according to a sound level, a tone, and a frequency of the voice of the each person. The executing module 103 can further indicate the mood of the each person in the video data. In at least one embodiment, the executing module 103 can indicate the mood of the each person using text.

In at least one embodiment, the executing module 103 can further generate a conference record based on the posture language, and the text information corresponding to each person; and display the generated conference record using the output device 3.

In at least one embodiment, the executing module 103 can generate the conference record according to speaking time corresponding to the posture language, and speaking time corresponding to the text information that is corresponding to each person.

It should be noted that the executing module 103 should obtain the speaking time corresponding to the posture language, and the speaking time corresponding to the text information that is corresponding to each person from the multimedia file.

Figure 4:
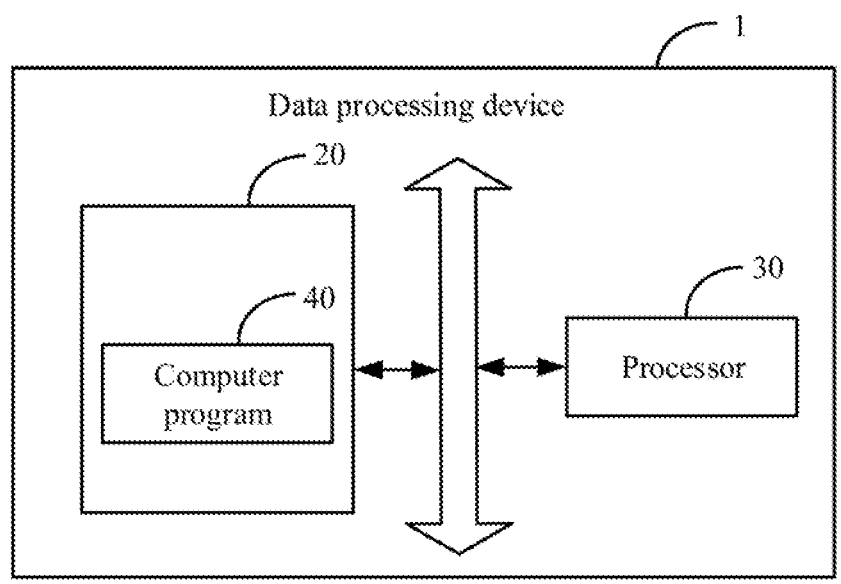
FIG. 4 shows one embodiment of a schematic structural diagram of a data processing device of the present disclosure.

FIG. 4 shows one embodiment of a schematic structural diagram of a data processing device. In an embodiment, a data processing device 1 includes a storage device 20, at least one processor 30, and a computer program 40 (such as the conference recording system). It should be understood by those skilled in the art that the structure of the data processing device 1 shown in FIG. 4 does not constitute a limitation of the embodiment of the present disclosure. The data processing device 1 may have a bus type structure or a star type structure, and the data processing device 1 may further include other hardware or software, or the data processing device 1 may have different component arrangements.

Illustratively, the computer program 40 can include one or more modules that are stored in the storage device 20 and executed by the processor 30 to implement conference recording function (such as described in detail in FIG. 2). The one or more modules can comprise computerized instructions in a form of one or more computer-readable programs that can be stored in a non-transitory computer-readable medium (e.g., a storage device of the data processing device), and executed by at least one processor of the data processing device to implement conference recording function (described in detail in FIG. 2).

For example, the computer program 40 can include a plurality of modules. The plurality of modules can include, but is not limited to the obtaining module 101, the extracting module 102, and the executing module 103. The modules 101-103 can comprise computerized instructions in the form of one or more computer-readable programs that can be stored in the non-transitory computer-readable medium (e.g., the storage device of the data processing device), and executed by the at least one processor of the data processing device to implement conference recording function (e.g., described in detail in FIG. 2). The data processing device 1 may be a computing device such as a desktop computer, a notebook, a palmtop computer, and a cloud server. It will be understood by those skilled in the art that the schematic diagram is merely an example of the data processing device 1 and does not constitute a limitation on the data processing device 1, and may include more or less components than those illustrated, or combine some components, or different components, such as the data processing device 1, may also include input and output devices, network access devices, buses, and the like.

In at least one embodiment, the data processing device 1 can include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the data processing device 1 is merely an example, and other existing or future electronic products may be included in the scope of the present disclosure, and are included in the reference.

In some embodiments, the storage device 20 can be used to store program codes of computer readable programs and various data, such as the conference recording system 10 installed in the data processing device 1, and automatically access to the programs or data with high speed during running of the data processing device 1. The storage device 20 can include a read-only memory (ROM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other non-transitory storage medium readable by the data processing device 1 that can be used to carry or store data.

In some embodiments, the at least one processor 30 may be composed of an integrated circuit, for example, may be composed of a single packaged integrated circuit, or may be composed of multiple integrated circuits of same function or different functions. The at least one processor 30 can include one or more central processing units (CPU), a microprocessor, a digital processing chip, a graphics processor, and various control chips. The at least one processor 30 is a control unit of the data processing device 1, which connects various components of the data processing device 1 using various interfaces and lines. By running or executing a computer program or modules stored in the storage device 20, and by invoking the data stored in the storage device 20, the at least one processor 30 can perform various functions of the data processing device 1 and process data of the data processing device 1. For example, the function of performing the conference recording.

Although not shown, the data processing device 1 may further include a power supply (such as a battery) for powering various components. Preferably, the power supply may be logically connected to the at least one processor 30 through a power management device, thereby, the power management device manages functions such as charging, discharging, and power management. The power supply may include one or more a DC or AC power source, a recharging device, a power failure detection circuit, a power converter or inverter, a power status indicator, and the like. The data processing device 1 may further include various sensors, such as a BLUETOOTH module, a Wi-Fi module, and the like, and details are not described herein.

In at least one embodiment, as shown in FIG. 3, the at least one processor 30 can execute various types of applications (such as the conference recording system 10) installed in the data processing device 1, program codes, and the like. For example, the at least one processor 30 can execute the modules 101-103 of the conference recording system 10.

In at least one embodiment, the storage device 20 stores program codes. The at least one processor 30 can invoke the program codes stored in the storage device to perform functions. For example, the modules described in FIG. 3 are program codes stored in the storage device 20 and executed by the at least one processor 30, to implement the functions of the various modules for the purpose of conference recording.

In at least one embodiment, the storage device 20 stores one or more instructions (i.e., at least one instruction) that are executed by the at least one processor 30 to achieve the purpose of conference recording.

In at least one embodiment, the at least one processor 30 can execute the at least one instruction stored in the storage device 20 to perform the operations of as shown in FIG. 1.

The steps in the method of the embodiments of the present disclosure may be sequentially adjusted, merged, and deleted according to actual needs.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A conference recording method applied to a data processing device, the method comprising:
   obtaining a multimedia file corresponding to a conference, wherein the multimedia file comprises video data and audio data;
   recognizing posture language of a person from the video data of the multimedia file; and extracting facial features of the person from the video data, and extracting voice features of the person from the audio data of the multimedia file;

identifying personal identity information of the person according to the facial features and the voice features of the person;

converting the audio data corresponding to the person into text information; and outputting the posture language, the personal identity information, and the text information corresponding to the person;

wherein the recognizing of the posture language of the person from the video data comprises:

extracting an image frame comprising the person from the video data;

identifying key points of the person in the image frame;

generating a connection line corresponding to the image frame by connecting the key points in the image frame;

converting the connection line into a vector distance;

determining a posture feature of the person in the image frame according to the vector distance; and determining the posture language of the person by searching a predetermined database according to the posture feature, wherein the predetermined database pre-stores a first relationship between the posture feature and the posture language.

2. The method according to claim 1, further comprising:
separating the video data and the audio data from the multimedia file when the multimedia file is obtained from a capture device;

sharpening face information when the video data comprises the face information; sharpening posture information when the video data comprises the posture information; and enhancing a voice comprised in the audio data when the audio data comprises the voice; and obtaining another multimedia file from the capture device when the video data does not comprise the face information, and the audio data does not comprise the voice.

3. The method according to claim 1, wherein the determining of the posture feature comprises:
determining distance changes between two of the key points.

4. The method according to claim 1, wherein the identifying of personal identity information of the person according to the facial features and the voice features of the person comprises:

searching the predetermined database according to the facial features and the voice features of the person, the predetermined database pre-stores a second relationship between the personal identity information of the person and the facial features and the voice features of the person.

5. The method according to claim 4, wherein when the personal identity information of the person cannot be obtained from the predetermined database, the method further comprises:

storing the facial features and the voice features of the person in the predetermined database.

6. A data processing device comprising:
a storage device;
at least one processor; and
the storage device storing one or more programs, which when executed by the at least one processor, cause the at least one processor to:

obtain a multimedia file corresponding to a conference, wherein the multimedia file comprises video data and audio data;

recognize posture language of a person from the video data of the multimedia file; and extract facial features of the person from the video data, and extracting voice features of the person from the audio data of the multimedia file;

identify personal identity information of the person according to the facial features and the voice features of the person;

convert the audio data corresponding to the person into text information; and output the posture language, the personal identity information, and the text information corresponding to the person;

wherein the recognizing of the posture language of the person from the video data comprises:

extracting an image frame comprising the person from the video data;

identifying key points of the person in the image frame;

generating a connection line corresponding to the image frame by connecting the key points in the image frame;

converting the connection line into a vector distance;

determining a posture feature of the person in the image frame according to the vector distance; and determining the posture language of the person by searching a predetermined database according to the posture feature, wherein the predetermined database pre-stores a first relationship between the posture feature and the posture language.

7. The data processing device according to claim 6, the at least one processor is further caused to:

separate the video data and the audio data from the multimedia file when the multimedia file is obtained from a capture device;

sharpen face information when the video data comprises the face information; sharpen posture information when the video data comprises the posture information; and enhance a voice comprised in the audio data when the audio data comprises the voice; and obtain another multimedia file from the capture device when the video data does not comprise the face information, and the audio data does not comprise the voice.

8. The data processing device according to claim 6, wherein the determining of the posture feature comprises:
determining distance changes between two of the key points.

9. The data processing device according to claim 6, wherein the identifying of personal identity information of the person according to the facial features and the voice features of the person comprises:

searching the predetermined database according to the facial features and the voice features of the person, the predetermined database pre-stores a second relationship between the personal identity information of the person and the facial features and the voice features of the person.

10. The data processing device according to claim 9, wherein when the personal identity information of the person cannot be obtained from the predetermined database, the at least one processor is further caused to:

store the facial features and the voice features of the person in the predetermined database.

11. A non-transitory storage medium having instructions stored thereon, when the instructions are executed by a processor of a data processing device, the processor is configured to perform a conference recording method, wherein the method comprises:

obtaining a multimedia file corresponding to a conference, wherein the multimedia file comprises video data and audio data;

recognizing posture language of a person from the video data of the multimedia file; and extracting facial features of the person from the video data, and extracting voice features of the person from the audio data of the multimedia file;

identifying personal identity information of the person according to the facial features and the voice features of the person.;

converting the audio data corresponding to the person into text information; and outputting the posture language, the personal identity information, and the text information corresponding to the person;

wherein the recognizing of the posture language of the person from the video data comprises:

extracting an image frame comprising the person from the video data;

identifying key points of the person in the image frame;

generating a connection line corresponding to the image frame by connecting the key points in the image frame;

converting the connection line into a vector distance;

determining a posture feature of the person in the image frame according to the vector distance; and determining the posture language of the person by searching a predetermined database according to the posture feature, wherein the predetermined database pre-stores a first relationship between the posture feature and the posture language.

12. The non-transitory storage medium according to claim 11, wherein the method further comprises:

separating the video data and the audio data from the multimedia file when the multimedia file is obtained from a capture device;

sharpening face information when the video data comprises the face information; sharpening posture information when the video data comprises the posture information; and enhancing a voice comprised in the audio data when the audio data comprises the voice; and obtaining another multimedia file from the capture device when the video data does not comprise the face information, and the audio data does not comprise the voice.

13. The non-transitory storage medium according to claim 11, wherein the determining of the posture feature comprises:

determining distance changes between two of the key points.

14. The non-transitory storage medium according to claim 11, wherein the identifying of personal identity information of the person according to the facial features and the voice features of the person comprises:

searching the predetermined database according to the facial features and the voice features of the person, the predetermined database pre-stores a second relationship between the personal identity information of the person and the facial features and the voice features of the person.

15. The non-transitory storage medium according to claim 14, wherein when the personal identity information of the person cannot be obtained from the predetermined database, the method further comprises:

storing the facial features and the voice features of the person in the predetermined database.

\* \* \* \* \*